United States Patent

Upton

[11] 3,785,155
[45] Jan. 15, 1974

[54] HYDRODYNAMIC UNIT WITH AUXILIARY ROTOR

[75] Inventor: Ernest W. Upton, Bloomfield Hills, Mich.

[73] Assignee: General Motors Corporation, Detroit, Mich.

[22] Filed: Nov. 28, 1972

[21] Appl. No.: 310,025

[52] U.S. Cl. .................. 60/347, 60/352, 60/362, 60/358
[51] Int. Cl. ........................................... F16h 41/00
[58] Field of Search ................... 60/341, 345, 347, 60/352, 357, 358, 362

[56] References Cited
UNITED STATES PATENTS 3,189,144   6/1965   Gabriel ............................. 60/362 X
3,433,096   3/1969   Tuck et al ........................ 60/341 X Primary Examiner—Edgar W. Geoghegan
Attorney—W. E. Finken et al.

[57] ABSTRACT

A bladed auxiliary pump, disposed adjacent to the exit of a bladed primary pump of this torque converter, is selectively connectable to the converter input by a clutch actuated by turbine and stator thrust forces. When the clutch is engaged, the blading of the auxiliary rotor changes the fluid flow from the primary pump into the turbine to decrease the torque absorption capacity of the converter. By feeding fluid to the converter through a special feed passage, the turbine and stator thrust forces can be cancelled to effect the disengagement of the clutch to release of auxiliary pump and thereby increase the capacity of the converter.

6 Claims, 2 Drawing Figures

HYDRODYNAMIC UNIT WITH AUXILIARY ROTOR

This invention relates to power transmission and more particularly to hydrodynamic torque transmitting unit having an auxiliary rotor means selectively operative in response to predetermined unit operating conditions to change unit torque absorption capacity.

Auxiliary rotors have been used in prior converters and couplings for changing their operating characteristics to suit particular needs and applications. For example, to increase the torque absorption capacity of a torque converter, an auxiliary pump having blading with positive or forwardly extending tip angles has been selectively connected to the rotatable input by clutch mechanisms disposed within the fluid unit. With the auxiliary pump clutched inthe circuit, the direction of fluid flow from a primary pump into the turbine is effectively changed to increase the torque capacity of the unit. To decrease the torque capacity the clutch is disengaged to disconnect the auxiliary pump from the input.

While such arrangements have provided improved control of torque transmission they generally incorporate special support shells operatively mounted between the turbine and the converter housing to provide a high-capacity, large-diameter clutch. Due to their configuration and location, converted pressures including variable centrifugal pressures on these shells makes clutch apply and release difficult to properly calibrate. Often intricate clutch controls or special housings and shrouds for such clutches have been required to improve clutch operation.

In this invention special clutch construction is provided which eliminates the requirement for complicated controls, large diameter supporting shells and clutch shrouds. In the preferred embodiment there is a torque converter with an auxiliary pump rotor selectively clutched into operation by utilizing the turbine and stator thrust forces as clutch engaging forces and utilizing converter charging pressure selectively as a clutch engaging or disengaging force. This auxiliary rotor has a bladed portion, disposed at the exit of a primary pump, that is connected to a hub located adjacent to a central flange of the cover. A friction clutch is carried by this hub and responds to the axial thrust load from the turbine and stator by fully engaging at converter stall to connect the auxiliary rotor in the converter circuit to reduce or increase the converter capacity depending upon the angular disposition of the auxiliary pump blading. The turbine thrust forces are progressively reduced from their high thrust force at stall to zero thrust at or near coupling. The stator thrust forces also progressively reduce as speed ratio increases. To selectively release the clutch, the converter oil feed is switched to a special feed passage leading to the clutch to counteract the turbine thrust forces. By controlling the pressure of charging fluid fed to the converter for clutch engagement and release, clutch engagement and disengagement can be graduated to provide for clutch slippage and smooth transition between high and low capacity operation.

In the preferred embodiment with the auxiliary rotor released, the converter operates with improved efficiency for steady state vehicle operation. If desired, the auxiliary pump rotor can be inactive for all phases of converter operation by the continuous feed of converter charging pressure through the auxiliary rotor clutch.

Preferably, the tips of the blades of the auxiliary rotor have a negative angle as compared to the tips of the blades of the primary pump. By clutching in the auxiliary rotor with the selectively engageable clutch, the flow from the pump to the turbine is modified to reduce the fluid unit capacity. When disengaged the auxiliary pump floats in the circulation so that discharge from the primary pump is not changed and capacity is increased.

With this invention the built-in and selective variation in converter capacity can be effectively employed to give an increase or decrease in engine working speed. This can be particularly beneficial in low power to weight vehicles such as the smaller economy passenger vehicle. Reduced capacity allows sufficient engine speed for vehicle start-up. Increased converter operating effeciency can be achieved by increasing converter capacity for steady state operation. By slipping the clutch subsequent to initial full engagement at stall, the capacity of the converter can be gradually increased with increased vehicle speed. For improved performance in high altitudes such as in mountainous terrain the converter can be maintained in low capacity operation for all phases of converter operation to increase engine speed for improved engine operation resulting in improved vehicle performance.

These and other features, objects and advantages of this invention will be more apparent from the following detailed description and drawing in which.

Figure 1:
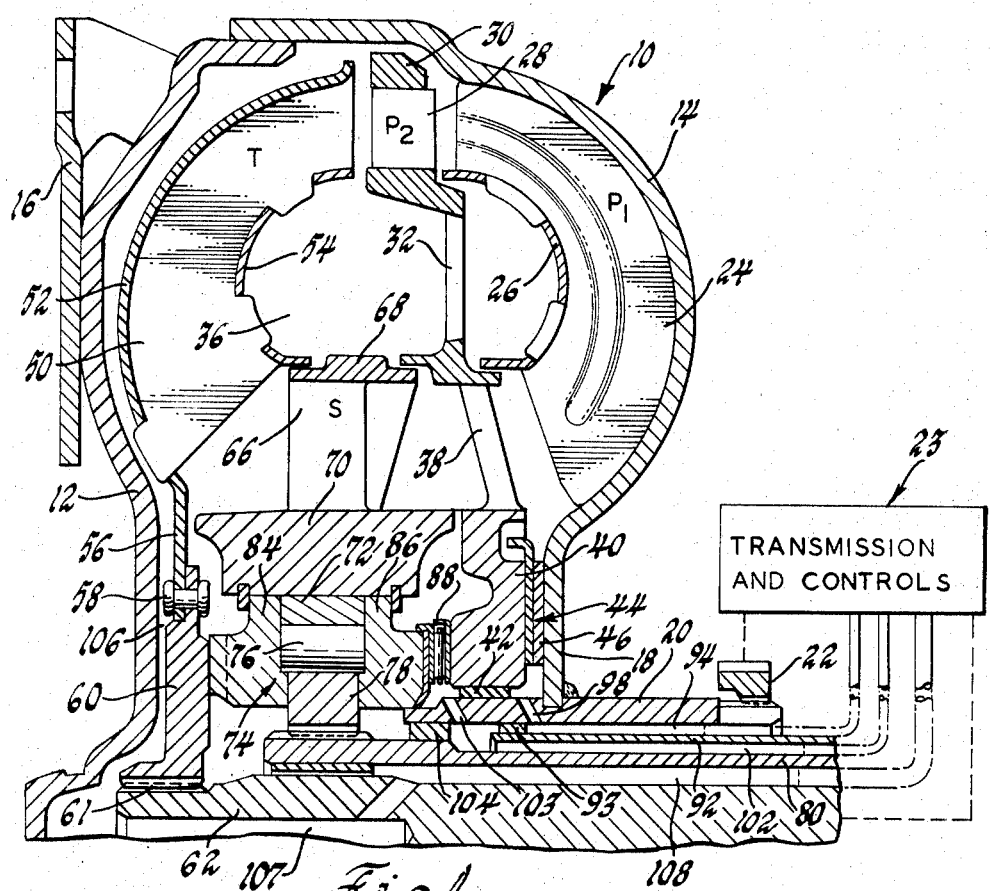
FIG. 1 is a sectional view of an upper portion of a torque converter incorporating this invention.

Referring to FIG. 1 there is a torque converter 10 having annular front and rear covers 12 and 14 welded together to form a rotatable converter housing adapted to be driven by an engine through drive lugs 16 fixed to the front cover 12. The rear cover 14 has a central flange 18 that is drivingly secured to a sleeve-shaft 20 which extends axially from the converter housing into driving engagement with an input gear 22 of an oil pump assembly that supplies operating oil for the transmission and transmission controls 23. Disposed within the converter housing is a primary pump $P_1$ comprising an annular arrangement of spaced blades 24 secured to the rear cover 14 and to an inner annular shell 26 which is driven in a forward or clockwise direction by the engine. Adjacent to the outlet of the primary pump $P_1$ is an auxiliary pump $P_2$ comprising a plurality of spaced blades 28 circumferentially mounted in a rotatable supporting wheel 30. This support wheel has a first set of equally spaced spokes 32 that extend generally radially through the core 36 of the converter and a second set of equally-spaced spokes 38 located inwardly of the spokes 32 and adjacent to the fluid inlet of the primary pump $P_1$. Preferably the spokes are designed for minimum interference in the flow stream. However, in other embodiments, the spokes 38 may be blade forms that increase pumping action. As shown, spokes 38 are secured to an inner annular hub 40 supported for rotation on sleeve shaft 20 by annular bushing 42. Also, this bushing provides for the limited axial movement of the auxiliary pump in the converter housing to engage and disengage an auxiliary pump clutch 44.

Clutch 44, operatively disposed between the outer side wall of hub 40 and the inside of the rear cover flange 18, is employed to selectively and drivingly connect the auxiliary pump to the rear cover 14 so that the auxiliary pump can be driven by the engine. Clutch 44 has a friction disc 46 bonded to an annular backing plate that in turn is secured into the rear face of inner hub 40 so that the axial thrust load from the turbine, the stator and the effects of charge pressure transmitted by the stator support structure and directed toward the primary pump $P_1$, causes the limited axial movement of the auxiliary pump $P_2$ and the drive engagement of the friction disc 46 with a friction surface on the interior of the flange 18. With clutch 44 so engaged the auxiliary pump will be driven by the converter housing to pump fluid in the converter.

Disposed adjacent to the auxiliary pump $P_2$ is a rotatable turbine T having a plurality of blades 50 that are connected between outer and inner annular shells 52 and 54. The outer shell has a central flange portion 56 that is connected by rivets 58 to the radial flange of a hub 60 which is splined at 61 to an axially-extending turbine shaft 62. The stator S is operatively disposed between the turbine T and the inlet of the primary $P_1$. This stator has a plurality of equally-spaced blades 66 supported between concentric outer and inner rings 68 and 70. The inner ring 70 of the stator is secured to an outer race 72 of a one-way brake 74. This one-way brake has cylindrical rollers 76 disposed between the outer race 72 and an inner race 78 which is splined to one end of an axially extending ground sleeve 80 disposed around turbine shaft 62 and secured to the transmission casing by a support not shown. The one-way brake engages to hold the stator against rotation in a rearward or counterclockwise direction during the torque multiplying phase of converter operation and disengages to allow forward or clockwise rotation of the stator when turbine speed approaches the speed of the primary pump for the coupling phase of converter operation.

Stator thrust rings 84 and 86 are fitted in the inner ring 70 of the stator and are disposed on opposite sides of the one-way brake 74. Secured between the outer side wall of thrust ring 86 and the inner side wall of hub 40 of the auxiliary pump is an annular roller bearing unit 88 for transmitting axial thrust loads to the hub 40 for engaging clutch 44 while allowing the auxiliary pump to rotate relative to the grounded stator. These thrust loads are primarily from the high centrifugal pressures built up between the turbine and front cover 12 due to high speed differentials between the pump and turbine. The thrust loads including those developed by the turbine and stator, are transmitted by the stator thrust rings to the clutch 44. These loads are maximum at stall and progressively diminish as the converter torque ratio progressively decreases to unity so that the resulting clutch apply force diminishes to effect clutch release.

Disposed between the ground sleeve 80 and the elongated sleeve shaft 20 is a sleeve shaft 92 which is secured to a fixed support in the transmission case not shown. Bushing 93 disposed at the end of shaft 92 acts as a seal between shafts 92 and 20. The annular space between sleeve shafts 92 and 20 provides an oil feed passage 94 for the converter which is connected to the transmission controls 23. As shown, suitable openings 98 in the sleeve shaft 20 connect passage 94 with the space between hub 40 and the flange 18 of the rear cover so that the converter can be supplied with oil at the inlet of the primary pump $P_1$. A second fluid feed passage 102 formed between the sleeve shaft 92 and stator ground sleeve 80 is operatively connected to the controls 23 and through opening 103 in sleeve shaft 20 to an inlet passage between thrust ring 86 and hub 40 so that the converter may be fed with operating fluid from the controls 23. Bushing 104 acts as a seal between sleeve shaft 20 and ground sleeve 80. Fluid is discharged from the converter back to the controls through a passage 106 extending between the front cover and the turbine and communicating passages 107 in the turbine shaft. This passage communicates to passage 108 formed between the stator ground sleeve and the turbine shaft 62.

In the preferred embodiment of this invention the blades of the primary pump have a forward or positive bend relative to the direction of pump rotation while the blades of the auxiliary pump have a negative or backward bend. When only the primary pump is operating, the oil discharged therefrom flows directly through the blading of the auxiliary pump into the blades of the turbine at an optimum flow angle so that the turbine absorbs a large percentage of the energy of the circulating oil. Under these circumstances the converter has maximum torque absorption capacity. When the auxiliary pump is clutched into the system the negative angle of the auxiliary pump blading modifies the flow from the pump so that the torque absorbed by the pump is reduced to thereby reduce the torque absorption capacity of the converter. If the blades of the auxiliary pump are formed with a positive or forward bend the capacity of converter 10 is increased with the drive engagement of clutch 44.

Figure 2:
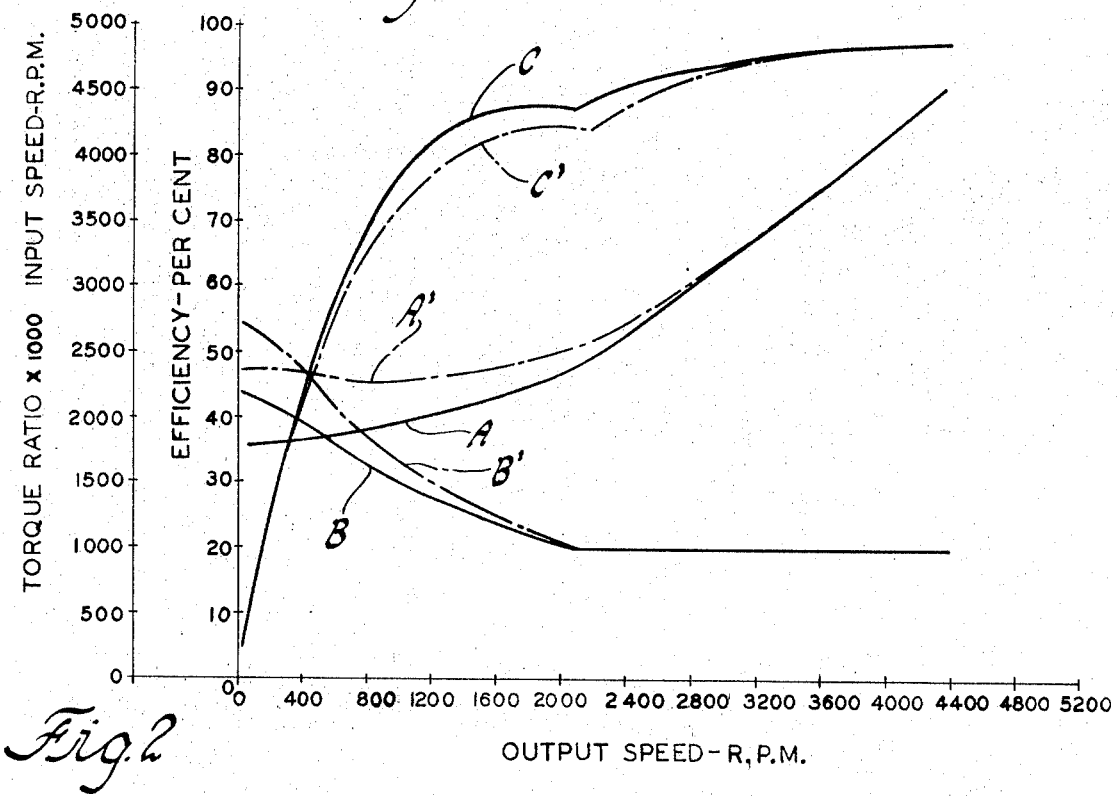
FIG. 2 are performance curves at constant input torque illustrating operation of the preferred embodiment of this invention.

The high and low capacity operations of the converter are illustrated in FIG. 2 at a constant input torque. Curves A, B, C represent pump speed, torque ratio and efficiency of the converter in high capacity operation with clutch 44 disengaged and the auxiliary pump inactive. Curves A', B', C' represent pump speed, torque ratio and efficiency, respectively, of the converter in low capacity operation with clutch 44 engaged and the auxiliary pump active. As shown by the curves, a vehicle operator can increase engine speed and converter torque multiplication by activating the auxiliary pump to reduce converter capacity. To improve efficiency the vehicle operator disengages the clutch to deactivate the auxiliary pump to increase capacity.

Assuming that this converter is employed in a low power to weight vehicle and it is desired to accelerate the vehicle from a stationary position, a large output torque is needed. The controls are set for forward drive with oil being fed from the converter through passage 102 and discharged from the converter back through passage 108. As the throttle is opened the primary pump $P_1$ rotates at engine speed and the turbine T is stationary. There is a buildup of pressure in the converter housing between the turbine T and front cover 12 because of the high differential in pump and turbine speed. This pressure and stator thrust urges the turbine axially toward the pump and a resulting thrust force is imparted through thrust rings. This thrust is transmitted through the roller bearing unit 88 to the hub 40 of the auxiliary pump $P_2$ which moves to the right to engage clutch 44 so that the auxiliary pump is driven by the converter housing along with the primary pump.

Since the converter is in low capacity operation with pumps $P_1$ and $P_2$ operative, pump speed and stall torque are high as shown by curves A' and B'. Acceleration of the vehicle is therefore improved as compared to a transmission with a high capacity converter. When the vehicle has gained sufficient speed and momentum, the operator can revert to high capacity converter operation to improve efficiency. This is done by actuating the controls to switch converter feed from line 102 to line 94. With converter charging pressure being fed into the converter between hub 40 and flange 18 of the rear cover 14 the clutch will be progressively disengaged to remove the auxiliary pump $P_2$ from pumping activity.

If desired the converter can be conditioned for all high capacity operation by the continuous feed of charging pressure to the converter through passage 94 to keep the clutch 44 disengaged from stall through coupling.

For complete low capacity operation, such as might be used for high altitude operation to have higher engine speed, the converter is fed continuously through line 102. The thrust forces from the turbine and stator progressively reduce as the turbine accelerates to the speed of the pump, however the engagement of clutch 44 is maintained by the converter charge pressure in the feed passage between the stator and hub 40.

While the embodiment of the invention shown in the drawings and described above constitutes a preferred embodiment, it will be understood that other embodiments may be adopted, such as fall within the scope of the appended claims.

I claim:

1. A hydrodynamic torque transmitting unit comprising a rotatable housing, first rotor means operatively disposed in said housing for pumping fluid therein, an output, second rotor means operatively disposed in said housing for absorbing energy from the fluid pumped by said first rotor means to drive said output, connector drivingly connecting said second rotor means to said output, third rotor means mounted for rotation in said housing, clutch means selectively engageable for drivingly connecting said third rotor means with one of said other rotor means, and load transmitting means operatively disposed adjacent to said clutch means for transmitting the axial thrust load developed by one of said rotor means when said first rotor means is pumping fluid in said unit to said clutch means to effect the engagement of said clutch means, and control means for selectively disengaging said clutch means.

2. A hydrodynamic torque transmitting unit comprising a rotatable housing, first rotor means operatively disposed in said housing for pumping fluid therein, an output, second rotor means operatively disposed in said housing for absorbing energy pumped thereto by said first rotor means to drive said output, third rotor means mounted for rotation in said housing, selectively engageable clutch means operatively connected to said third rotor means for drivingly connecting said third rotor means with one of said first rotor means, load transmitting means operatively disposed adjacent to said clutch means for transmitting the axial thrust load developed by said second rotor means to said clutch means in response to the centrifugal buildup of pressure within said housing to cause the engagement of said clutch means, and control means for feeding operating fluid to said housing through said clutch means to disengage said clutch means so that said third rotor means freely rotates in said housing.

3. A variable capacity hydrodynamic torque transmitting unit comprising a rotatable housing adapted to be driven at varying speeds by a vehicle engine, first rotor means operatively disposed in said housing for pumping fluid therein, a rotatable output, second rotor means drivingly connected to said output and operatively disposed in said housing for absorbing energy from the fluid pumped by said first rotor means to drive said output, third rotor means mounted for rotation in said housing, selectively engageable clutch means for drivingly connecting said third rotor means with said housing to decrease the capacity of said unit so that said first rotor means can be driven at increased speeds at unit stall and up to unit coupling, load transmitting means operatively disposed adjacent to said clutch means for transmitting the axial thrust load developed by said second rotor means in response to the rotational speed differential between said first and second rotor means to effect the engagement of said clutch means and fluid feed control means for supplying operating fluid to said unit and for disengaging said clutch means to thereby increase the capacity of said unit.

4. A hydrodynamic torque transmitting unit comprising rotatable input and output means, rotatable housing means drivingly connected to said input means, bladed pump means secured to said housing means for pumping fluid in said housing, bladed turbine means rotatably mounted in said housing drivingly connected to said output means for receiving fluid from said pump means and absorbing energy from said fluid circulated by said pump means to drive said output means, bladed stator means operatively mounted in said housing for directing fluid exiting from said turbine means into said pump means, bladed auxiliary rotor means mounted for free rotation in said unit, and clutch means operatively disposed in said unit adjacent to said stator means and operatively connected to said auxiliary rotor means for selective engagement with said housing to drivingly connect said auxiliary rotor means with said housing means and thereby change the torque absorption capacity of said unit.

5. In a power transmission a hydrodynamic unit having a rotatable housing, a bladed main pump operatively connected to said housing, a bladed auxiliary pump, a bladed turbine and a bladed stator disposed in a toroidal fluid flow relationship in said housing, a support for said stator, a driven member connected to said turbine, and clutch means operatively connected to said auxiliary pump and disposed between said stator support and said housing and selectively engageable therewith in response to axial thrust force transmitted from said stator to drivingly connect said auxiliary pump to said housing to condition said unit for a first torque capacity, and control means to disengage said clutch means from clutching engagement with said housing to change the torque capacity of said unit from said first torque capacity.

6. A hydrodynamic torque converter comprising a rotatable housing, a bladed pump means operatively disposed in said housing for pumping fluid in said housing, a rotatable output means turbine means operatively disposed in said housing and drivingly connected to said output means, said turbine means having blading for absorbing energy from the fluid pump thereto by said pump means, auxiliary pump means operatively disposed between said pump means and said turbine means, support means mounting said auxiliary pump means for rotation in said housing, clutch means disposed on said support means, stator means operatively disposed between said turbine means and said primary pump means, said stator means having thrust transmitting means for transmitting the thrust loads developed by said turbine means from stall up to coupling for axially moving said support means and effecting the engagement of said clutch means so that said auxiliary rotor means pumps fluid in said housing to thereby change the torque absorption capacity of said converter from a predetermined torque abosrption capacity, and fluid feed means for feeding fluid into said converter through said clutch means to effect the disengagement of said clutch means and deactivate said auxiliary pump means from pumping action in said converter so that said converter reverts back to the predetermined torque absorption capacity.

* * * * *